(12) United States Patent
Allen et al.

(10) Patent No.: US 7,953,144 B2
(45) Date of Patent: May 31, 2011

(54) METHOD AND SYSTEM FOR DETECTING IMPULSE NOISE IN A BROADBAND COMMUNICATION SYSTEM

(75) Inventors: Jim Allen, Naperville, IL (US); Tom Cloonan, Lisle, IL (US)

(73) Assignee: ARRIS Group, Inc., Suwanee, GA (US)

( * ) Notice: Subject to any disclaimer, the term of this patent is extended or adjusted under 35 U.S.C. 154(b) by 749 days.

(21) Appl. No.: 11/861,263

(22) Filed: Sep. 25, 2007

(65) Prior Publication Data

US 2008/0075157 A1 Mar. 27, 2008

Related U.S. Application Data

(60) Provisional application No. 60/846,954, filed on Sep. 25, 2006.

(51) Int. Cl.
*H04B 3/46* (2006.01)
*H04B 17/00* (2006.01)
*H04Q 1/20* (2006.01)

(52) U.S. Cl. ........................ 375/227; 375/346

(58) Field of Classification Search ............. 375/227, 375/346–350
See application file for complete search history.

(56) References Cited

U.S. PATENT DOCUMENTS

| 5,548,719 | A | * | 8/1996 | DeVane et al. | 714/39 |
| 5,887,075 | A | * | 3/1999 | Kruppa | 382/139 |
| 7,702,049 | B2 | * | 4/2010 | Tsui et al. | 375/347 |
| 2005/0111561 | A1 | * | 5/2005 | Sedarat et al. | 375/260 |

* cited by examiner

*Primary Examiner* — Curtis B Odom
(74) *Attorney, Agent, or Firm* — Troy A. Van Aacken; Robert J. Starr

(57) ABSTRACT

A method halts transmission and/or reception of a desired signal on a channel in a communication network and samples an analog metric versus time on the channel at a predetermined sample rate. Successively sampled sets of data are stored first to a one dimensional array, each of which set is then stored to a two-dimensional array. The two dimensional array is analyzed in the time domain to determine the presence of impulse noise. Analog parameters represented by values contained in the samples can be analyzed to determine where, with respect to time, impulse noise occurs, and what is the amplitude of the impulse noise as well as AWGN.

14 Claims, 5 Drawing Sheets

METHOD AND SYSTEM FOR DETECTING IMPULSE NOISE IN A BROADBAND COMMUNICATION SYSTEM

CROSS REFERENCE TO RELATED APPLICATION

This application claims priority under 35 U.S.C. 119(e) to the benefit of the filing date of Allen, U.S. provisional patent application No. 60/846,954 entitled "Method and system for detecting impulse noise in a broadband communication system," which was filed Sep. 25, 2006, and is incorporated herein by reference.

FIELD OF THE INVENTION

This invention relates, generally, to communication networks and, more particularly, to detecting and characterizing burst noise (aka impulse noise) at a network element in communication networks.

BACKGROUND

Technicians spend many man hours devising ways to minimize the effects of noise in communication systems and networks and the equipment that compose them. There are many different types of noise that can appear on a communication channel. These noise types include Additive-White-Gaussian Noise (AWGN), narrow-band ingress noise and time-variant burst noise (aka impulse noise). It is understood to those skilled in the art that AWGN and narrow-band ingress noise tend to be relatively constant as a function of time, whereas time-variant burst noise occurs at distinct epochs in time, leaving the channel essentially unaffected in the windows of time between successive bursts.

There are many different techniques that can be used to minimize the effects of noise in a communication system. Some of the well-known techniques in the industry include the use of equalization, the use of Forward-Error Correcting (FEC) codes, the use of lengthened preambles, the use of byte interleaving, the use of CDMA symbol spreading and symbol de-spreading, the use of Trellis-Coded Modulation, the use of notch filters, etc. Each of these techniques can be used effectively for some sub-set of the noise types. For example, notch filters work well for mitigating the effects of ingress noise, but notch filters do not offer much value in mitigating the effects of AWGN or burst noise. As a result, it behooves the technician to have information regarding the types of noise and the parameters of noise that are present on a given channel before selecting which noise mitigation techniques should be applied to that particular channel. This is particularly true for time-variant burst noise.

Time-variant burst noise is characterized by short, quasi-periodic intervals during which the instantaneous noise power exceeds the ambient AWGN background noise. Data transmissions occurring during this noise burst will typically experience a data error rate that is significantly higher than data transmitted when the noise bursts are not present. As a result, standard, well-known methods for calculating data error rates as a function of signal-to-noise ratios (which typically assume the existence of only AWGN sources) do not typically predict actual data error rates when burst noise is present. Thus, alternative methods must be used which can detect and characterize the parameters of the burst noise if one is to correctly predict the data error rates from noise measurements on the channel.

Time-variant burst noise has several interesting parameters associated with it that can help a technician determine the expected data error rates, the types of noise mitigation techniques that should be applied to reduce those data error rates, and the particular settings on those noise mitigation techniques to optimize overall system performance. These burst noise parameters of interest can include the absolute amplitude of the burst noise, the relative amplitude of the burst relative to the background AWGN, the duration of the burst noise, and the period between successive occurrences of bursts. Knowing these parameters can help a field technician determine the minimum amount of noise mitigation to "throw at" the problem (i.e., apply to a noisy desired signal), because the use of excessive noise mitigation often leads to increases in channel overhead and reductions in channel bandwidth that would otherwise be available to the users for data transmission.

Detection and parametric characterization of these noise burst parameters is challenging. Most of the techniques used by field technicians in the past have proposed "looking for," or detecting, noise in the frequency domain. Unfortunately, time-variant burst noise is difficult to detect in the frequency domain, because it can have spectra that appear very similar to the spectra of AWGN or the spectra of multiple ingress noise sources. Some solutions applied in the field have required the total removal of signal transmissions from the channel. These solutions then use repeated spectrum analyzer measurements (looking for variations of power within the pass-band of successive measurements). These approaches can detect the existence of high-energy noise bursts on a channel, but they do not fare well with lower-energy noise bursts and they do not lend themselves to parametric characterization of the burst noise.

Thus, there is a need in the art for a method and system for detecting the presence of burst noise and for parametrically characterizing the burst noise in a communication system.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
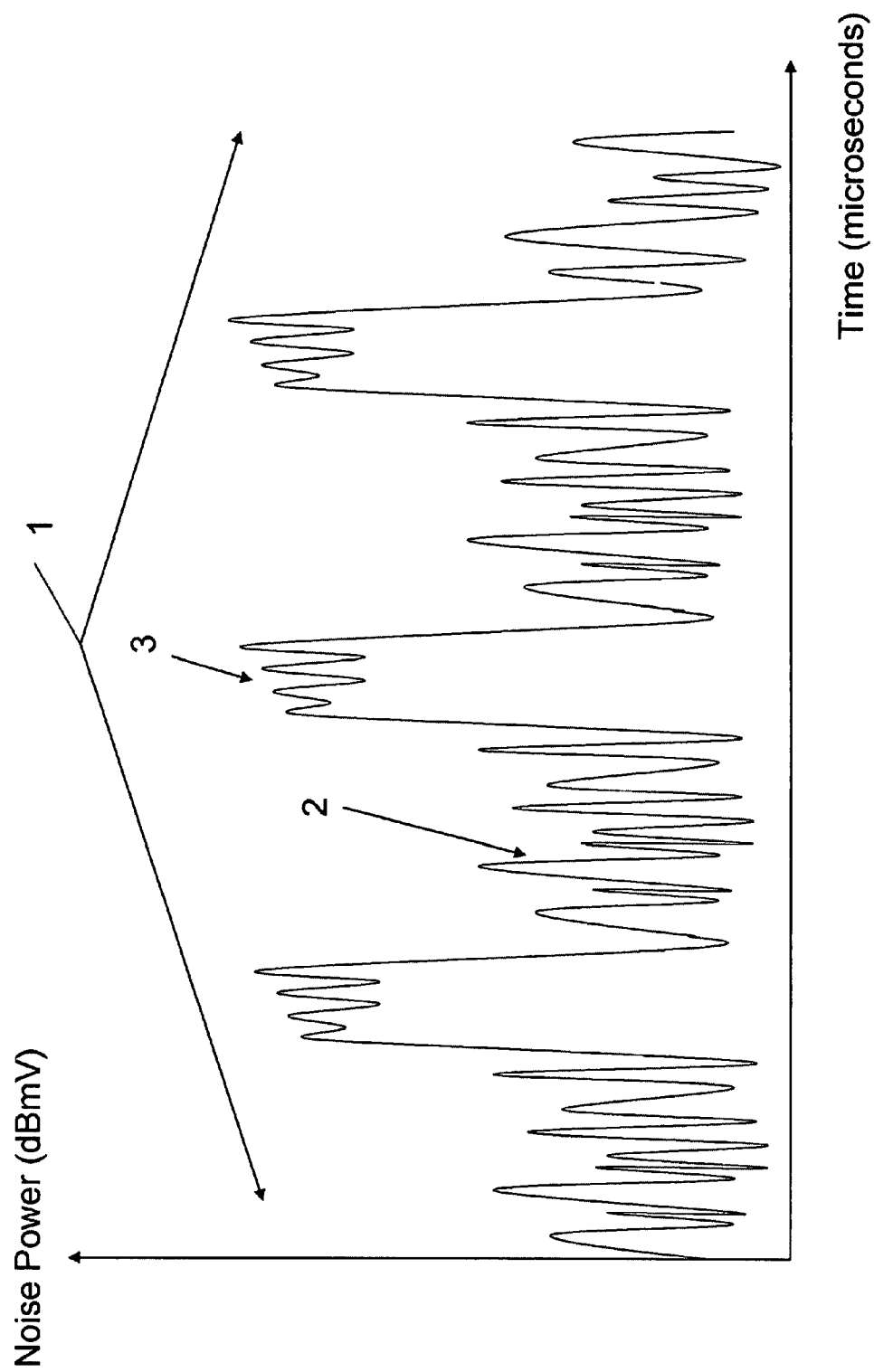
FIG. 1 graphically illustrates a time-domain plot of noise power with both AWGN and burst noise present FIG. 2 graphically illustrates a time-domain plot of noise power with both AWGN and burst noise present and with a best-fit, smoothed curve over-laid on the time-domain plot.

Turning now to the figures, FIG. 1 graphically illustrates a time-domain plot of noise power 1 with both AWGN 2 and burst noise 3 present. FIG. 1 shows that noise power 1 typically varies with time. FIG. 1 also shows that burst noise 3 oftentimes displays power bursts that are roughly periodic, meaning that the time duration between any two successive power bursts is roughly the same regardless of which two consecutive power bursts are selected. It should be understood that there can, however, be differences between these periods from time to time.

Figure 2:
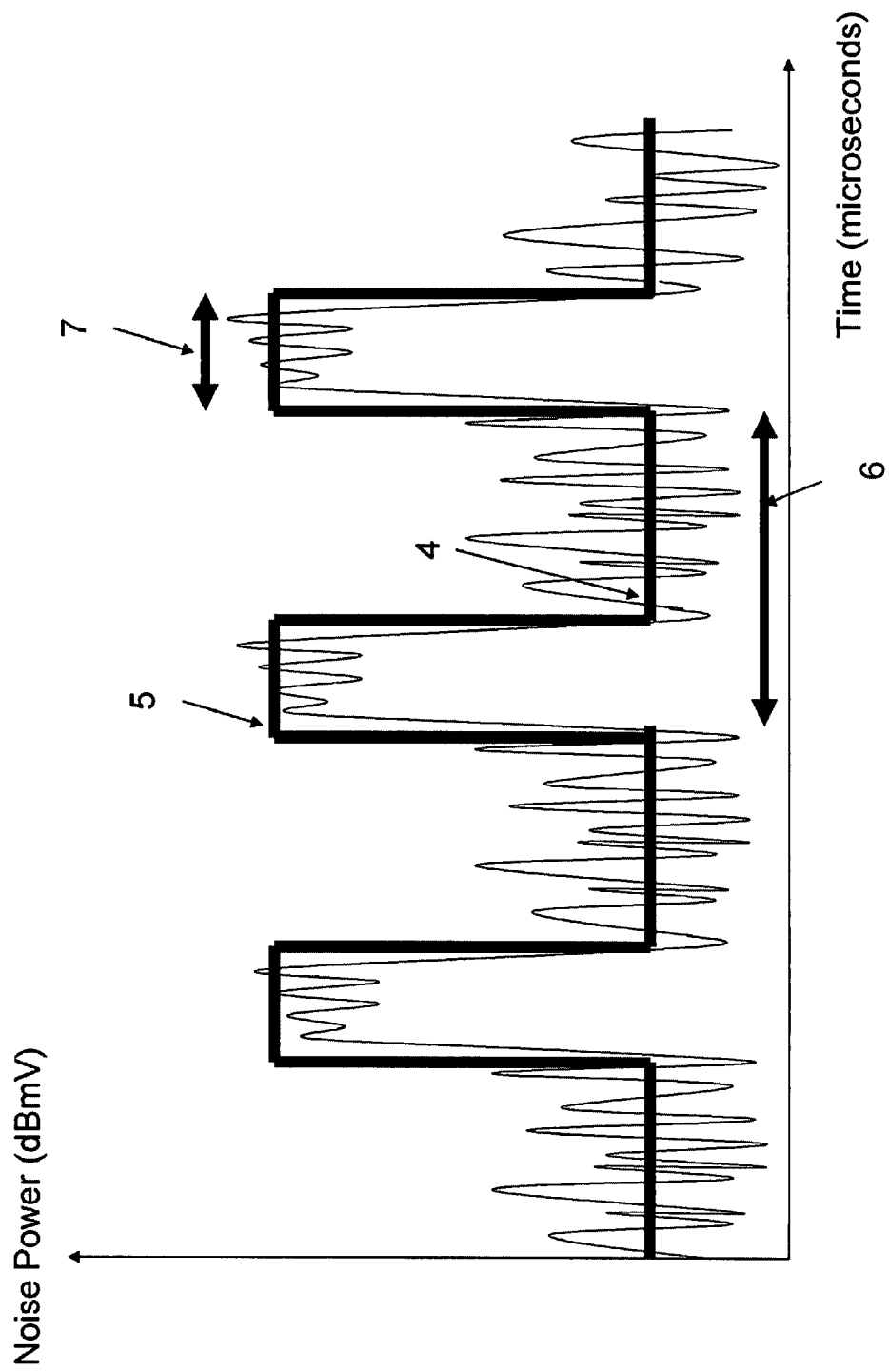

FIG. 2 illustrates the same time-domain plot of noise power that was shown in FIG. 1, but FIG. 2 overlays a best-fit, smoothed curve over the time-domain plot. The best-fit, smoothed curve attempts to describe the noise power plot with straight lines that approximate the values of the noise power plot. In particular, the best-fit curve shown in FIG. 2 is a periodic wave-train of rectangular pulses. It should be understood that the lower horizontal lines 4 indicate the power levels for the background AWGN. These regions are referred to as AWGN regions. It should also be understood that the higher horizontal lines 5 indicate the cumulative power levels for the sum of the burst noise and the AWGN, with most of the power in those regions typically being associated with the burst noise. These regions are referred to as AWGN/burst noise regions. The resulting wave-train of rectangular pulses is a typical pattern displayed by a best-fit curve on a noise power plot of combined AWGN and burst noise. This wave-train of rectangular pulses is periodic, with a period 6. Each period 6 of the wave-train is comprised of one region 4 with just AWGN, and another region 5 with the sum of AWGN and burst noise. The actual duration 7 of the burst noise is another important parameter associated with the wave-train. Data that is transmitted across a channel is always corrupted to some extent by the presence of the noise power shown in FIG. 1 and FIG. 2, but the corruption of data is typically much more severe during the duration 7 when the burst noise is present.

As a result, it should be clear that parametrically characterizing the details of the burst noise enhances the accuracy in predicting and optimizing channel performance. In particular, many communication channels use Reed-Solomon Forward Error Correction (RS-FEC) as a mechanism for correcting data errors on a channel that is experiencing noise. RS-FEC techniques permits the correction of up to T erroneous bytes within a codeword with K data bytes. This correction process is implemented at the channel receiver after the data has been passed across the noisy channel and has incurred data errors. RS-FEC requires the addition of 2*T parity bytes to each codeword that is transmitted, so the channel efficiency of the RS-FEC technique is given by K/(K+2*T). Obviously, the lower the value of T, the higher the channel efficiency for a given value of K. This makes it desirable for a field technician to make T as small as possible. However, reliable data transmission requires that T be large enough so that the probability of having a single codeword with more than T errors is less than a definable value. Unfortunately, burst noise can corrupt a large number of consecutive symbols within a codeword. As a result, the expected number of errors induced by a noise burst that occurs within a codeword must be determined, and T must therefore be set appropriately on any channels that experience this burst noise. Thus, it is desirable to have a reliable technique for detecting the burst noise and for parametrically characterizing the burst noise.

The following describes a technique for:
1) detecting the existence of burst noise on a channel
2) parametrically characterizing the details of the burst noise, the details including:
   a) the absolute amplitude of the burst noise,
   b) the relative amplitude of the burst relative to the background AWGN,
   c) the duration of the burst noise, and
   d) the period between successive occurrences of noise bursts. data transmissions that can detect when a data error has occurred Unlike previous techniques, the described aspects perform detection and parametric characterization operations on the noise signal in the time domain. In particular, this technique has three distinct phases of operation. These phases are referred to as the Collection Phase, the Detection Phase and the Parametric Characterization Phase.

Figure 3:
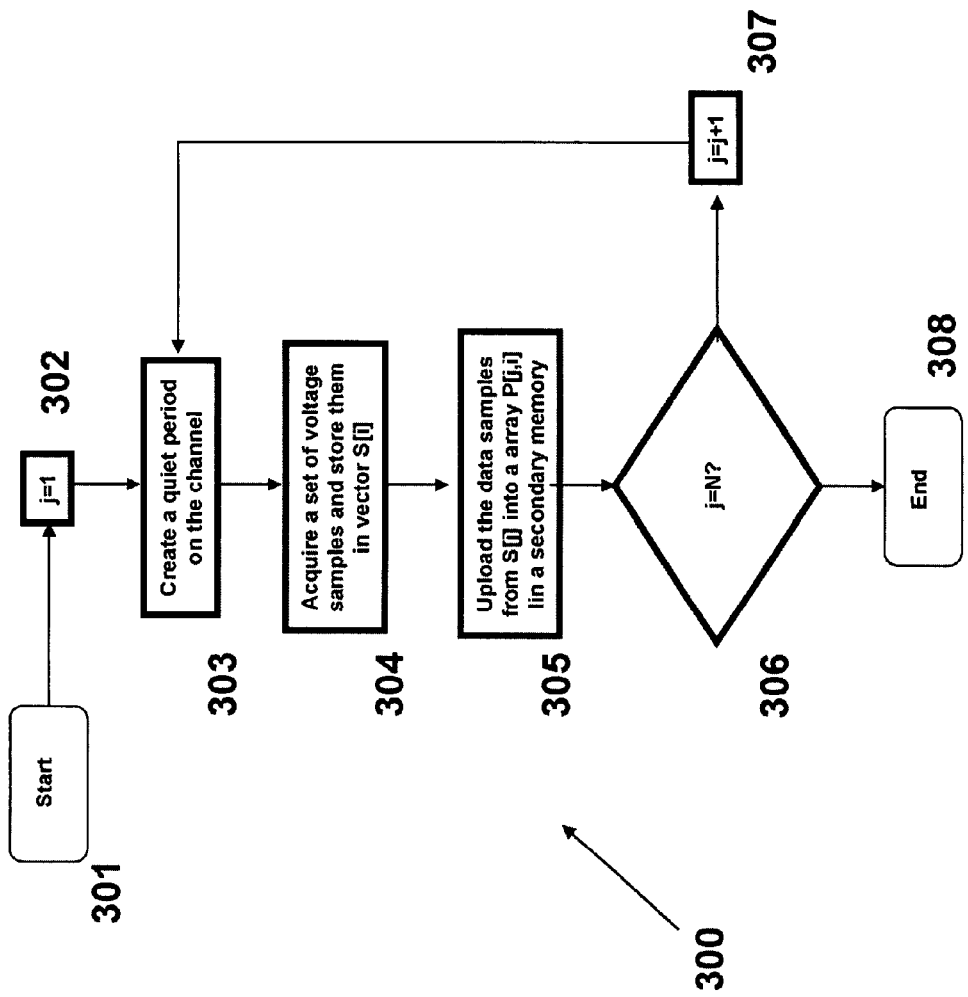
FIG. 3 illustrates a collection phase routine.

The collection phase routine 300 is illustrated in FIG. 3. The Collection Phase begins at step 301. A counter is initialized at step 302, indicating the number of measurement intervals. During the measurement interval, no data signal can be transmitted on the channel in step 303. This creates a quiet period on the channel when noise measurements can be made without having to separate data signal power contributions from noise power contributions. This results in simplifications within the noise measurement algorithms. This halting of data transmissions is possible on many systems (such as DOCSIS systems) where a centralized scheduler at the receiver is responsible for determining and instructing when each transmitter can transmit data.

Secondly, for step 304, circuitry at or near the channel's receiver acquires a set of voltage samples that have been band-pass filtered, and these successive samples are stored successively in the elements of a vector S[i]. The sample index i indicates the particular stored sample within the S[i] vector. These voltage samples are digitized samples of the analog voltage at the channel's receiver, and they are typically stored in a working memory (flip-flops or RAM) located at or near the channel's receiver. The digitization of the analog voltage is provided by an analog-to-digital converter. It should be understood that the band-pass filtering of the signal can be implemented either in the analog domain (before the analog-to-digital converters that sample the voltages on channel) or can be implemented in the digital domain (after the analog-to-digital converters that sample the voltages on the channel). These voltage samples (S[i]) represent the noise voltage values existing on the channel during a single measurement interval. The sampling rate of the noise voltage values must be selected to ensure that adequate resolution is provided in the sampled sequence S[i]. For example, adequate results have been observed in experiments if the sampling rate is set to be at least three times the frequency width of the channel's pass-band. The sampling rate and the duration of the measurement interval determine the number of samples in the S[i] vector. Typical systems might provide several thousand samples in the S[i] vector.

Third, in step 305, the digitized voltage samples S[i] from the single measurement interval are uploaded to a larger secondary memory (typically RAM) which can be located physically near the S[i] memory or can be located physically remote from the S[i] memory. This larger secondary storage memory is available to and accessible by a processor. The digitized voltage samples S[i] are stored in the larger secondary memory within a two-dimensional array P[j,i]. The measurement index j indicates the particular measurement interval, and the sample index i indicates the particular stored sample within the j-th measurement interval. It should be understood that the first set of digitized voltage samples S[i], which are associated with the first (j=1) measurement window, should be stored in the first row of the P[j,i] array.

Fourth, the first, second and third steps above are repeated for increasing values of the measurement index j in steps 306 and 307. The maximum value of j determines the total number of measurement intervals that are to be scheduled, and that value is typically determined to be a value that is large enough to ensure that multiple noise bursts will be captured within the many measurement intervals. The system can check if it has scheduled an adequate number of measurement intervals by counting the number of noise bursts that will be detected in subsequent steps of this algorithm. The measurement interval duration is typically the same for all of the measurement intervals, but it is important to realize that successive measurement intervals need not be contiguous. In fact, it is undesirable to have extremely long measurement intervals and it is also undesirable to have many contiguous measurement intervals, as this can degrade the channel's perceived performance by halting user transmissions for lengthy periods of time. The collection phase ends at step 308.

Figure 4:
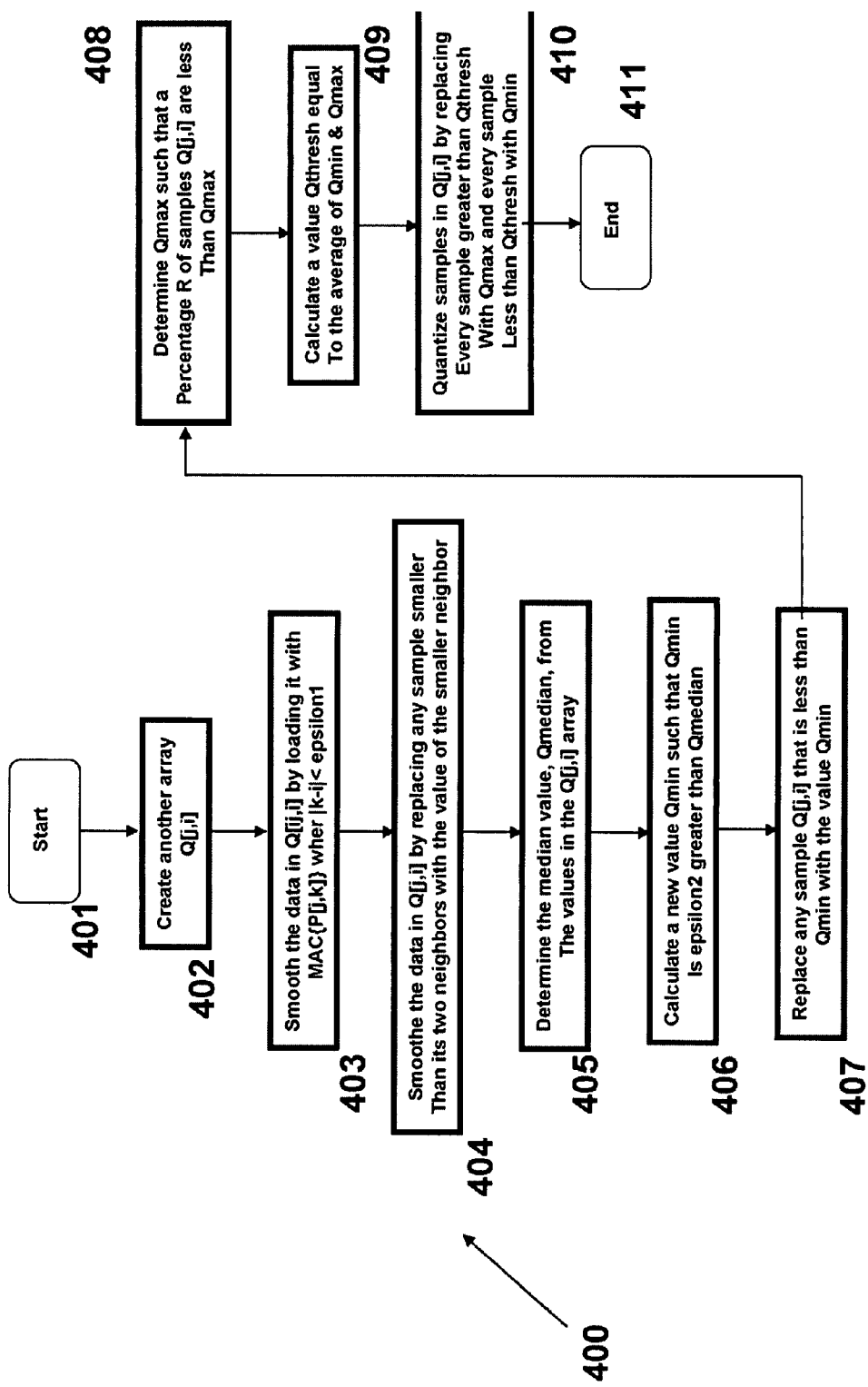
FIG. 4 illustrates a detection phase routine.

The Detection Phase, illustrated by method 400 in FIG. 4, begins at step 401 and utilizes the collected data in the P[j,i] array to detect the presence of noise bursts within the multiple measurement intervals. There are many techniques that can be used to perform this function. One of the simplest methods of detecting noise bursts is to plot each of the rows within the P[j,i] array as a voltage vs. time plot or as a instantaneous power vs. time plot. It will be appreciated that instantaneous power samples can be calculated from voltage samples by simply squaring and appropriately scaling the voltage samples. It has been found that detection of noise bursts within the measurement intervals is simplified if the instantaneous power vs. time plot has the instantaneous power plotted on a logarithmic scale, because the resulting noise bursts tend to stand out more clearly in these types of plots.

The Detection Phase can also be automated. Post-processing of the collected data in the P[j,i] array can be done in the processor that is co-located with the larger secondary memory. Many different algorithms for identifying and distinguishing between the AWGN regions (as shown by region 4 in FIG. 2) and the AWGN/burst, or impulse, noise regions (as shown by region 5 in FIG. 2). Generally speaking, the algorithm identifies regions on the noise power plots where the power is lower (the AWGN regions) and must also identify regions on the noise power plots where the power is significantly higher (the AWGN/burst noise regions).

One example of a particularly successful Detection Phase algorithm will be outlined below:
1. Create another array Q[j,i] where calculations will be performed (usually within the same memory). This is step 402.
2. Smooth the data in array Q[j,i] for a first time by loading each value Q[j,i] with the value MAX{P[j,k]} where |k−i|<epsilon1, where epsilon1 should be a relatively small value (like 4). This is step 403.
3. Smooth the data in array Q[j,i] for a second time by replacing any sample smaller than both if its neighbors (in the same row j) with the value of the smaller of its two neighbors (in that same row j). This is step 404.
4. Determine the median value, Qmedian, from of all of the values in all rows and all columns of the Q[j,i] array. This is step 405.
5. Calculate a new value Qmin such that Qmin is epsilon2 greater than Qmedian, where epsilon2 should be a relatively small value (like 4 dB). This is step 406.
6. Replace any sample Q[j,i] that is less than Qmin with the value Qmin. This is step 407.
7. Determine a new value Qmax such that a large percentage R of the samples Q[j,i] are less than Qmax, where R should be a relatively large value (like 99%). This is step 408.
8. Calculate a new value Qthresh equal to the average of Qmin (expressed in dB) & Qmax (expressed in dB). This is step 409.
9. Quantize the data samples in Q[j,i] to one of two values (Qmax or Qmin) by replacing every sample Q[j,i] that is greater than Qthresh with the value Qmax and by replacing every sample Q[j,i] that is less than Qthresh with the value Qmin. This is step 410.

The resulting data values in the Q[j,i] array have taken on values of either Qmax or Qmin. Q[j,i] values that are set to Qmax are values that have been identified by the algorithm as existing at moment in time when a noise burst was present. Similarly, Q[j,i] values that are set to Qmin are values that have been identified by the algorithm as existing at a moment in time when a noise burst was not present. Plotting of the resulting values will yield a best-fit, smoothed curve similar to the rectangular-shaped curve shown in FIG. 2. This marks the ending of the Detection Phase of the method at step 411.

Figure 5:
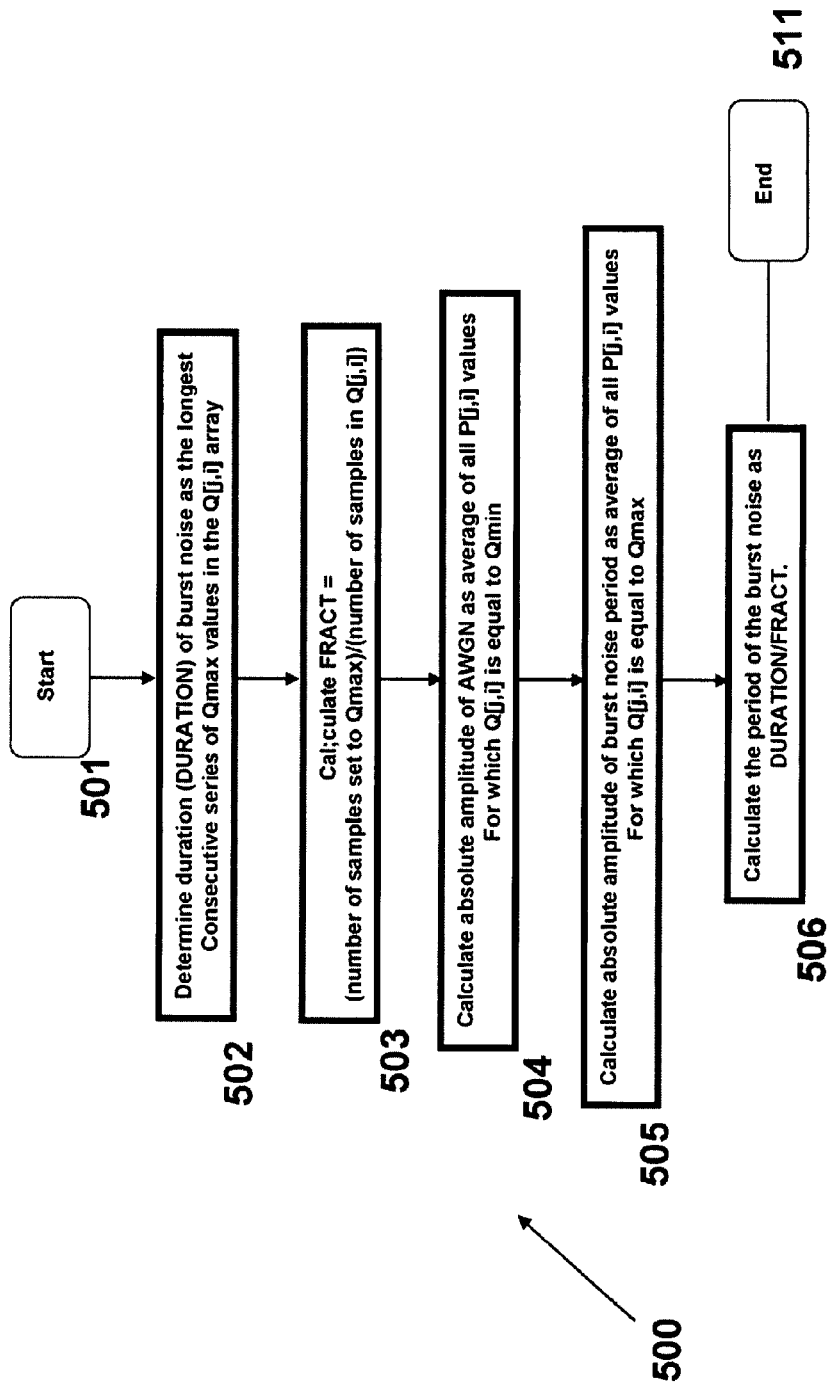
FIG. 5 illustrates a parametric characterization phase routine.

The third and final phase is the Parametric Characterization Phase. The Parametric Characterization Phase is illustrated by the flowchart 500 in FIG. 5. The Parametric Characterization Phase begins at step 501. The Parametric Characterization Phase utilizes the smoothed and quantized data in the Q[j,i] array to determine the specific parameters associated with the noise signals collected in the various measurement intervals. The four parameters of interest might be:
  a) the absolute amplitude of the burst noise,
  b) the absolute amplitude of the background AWGN,
  c) the duration of the burst noise, and
  d) the period between successive occurrences of noise bursts.

There are many techniques that can be used to perform this parametric characterization function. One of the simplest methods of characterizing the burst noise is to plot and visually analyze (by eye) each of the rows within the resulting Q[j,i] array as a voltage vs. time plot or as a instantaneous power vs. time plot. From these plots, one can easily measure the absolute amplitude of the burst noise. It is the Qmax values that appear in the plot (note: This value is actually the cumulative sum of the burst noise power contribution and the AWGN power contribution, but typically, most of this power is contributed by the higher-amplitude burst noise). One can also easily measure the absolute amplitude of the background AWGN. It is the Qmin values that appear in the plot. The duration (time 7 in FIG. 2) of the burst noise can be measured by measuring the temporal distance of each raised rectangle in the plot (region 5 in FIG. 2). The period (time 6 in FIG. 2) between successive occurrences of noise bursts can be measured by measuring the temporal distance between the starting points of successive raised rectangles. It should be understood by those skilled in the art that instantaneous power samples can be calculated from voltage samples by simply squaring and appropriately scaling the voltage samples. It has been found that detection of noise bursts within the measurement intervals is simplified if the instantaneous power vs. time plot has the instantaneous power plotted on a logarithmic scale, because the resulting noise bursts tend to stand out more clearly to the eye in these types of plots.

The Parametric Characterization Phase can also be automated. Post-processing on the collected data in the Q[j,i] array can be done in the processor that is co-located with the larger secondary memory. Many different algorithms for determining the four parameters can be identified. Generally speaking, the algorithm calculates the four parameters from the Q[j,i] array. One example of a particularly successful Parametric Characterization Phase algorithm is outlined below:

1. Determine the duration (DURATION) of the burst noise. This duration is merely the longest consecutive series of values that are equal to Qmax in the entire Q[j,i] array. This is step 502.
2. Calculate a new value FRACT which is equal to the fraction of samples in the entire Q[j,i] array that are set to Qmax. In other words:

FRACT=(number of samples set to Qmax)/(number of samples in Q[j,i]). This is step 503.

3. Calculate the absolute amplitude of the background AWGN, which is equal to the average of all P[j,i] values for which their corresponding Q[j,i] value is equal to Qmin. This is step 504.
4. Calculate the absolute amplitude of the noise during a burst, which is equal to the average of all P[j,i] values for which their corresponding Q[j,i] value is equal to Qmax. This is step 505.
5. Calculate the period between successive occurrences of noise bursts, which is equal to (DURATION/FRACT). This is step 506.

This marks the ending of the Parametric Characterization Phase of the method in step 511.

A centralized scheduler schedules a quiet period of time during which no transmitter is allowed to transmit, and the circuitry described elsewhere herein can be made cognizant of the particular time when that idle duration will occur. During the idle duration, circuitry positioned near the receiving portion of a network device receives a time-domain signal from the channel at a point near the channel's output port. The received time-domain channel signal is typically band-pass filtered to remove noise power from regions of the spectrum outside of the channel's pass-band. The signal emanating from this filtering process is referred to as a filtered time-domain signal. It should be understood that this digital-to-analog conversion can take place at various stages in the receiver process. In particular, digital-to-analog conversion could be done on the

What is claimed is:

1. A method for collecting time-domain data to be used for detecting presence of impulse noise on a communication system channel, comprising:
   creating a measurement interval during which no data signal can be transmitted on the channel;
   acquiring voltage samples at a predetermined sample rate;
   bandpass filtering the acquired voltage samples; and
   storing the bandpass filtered samples to a working memory as elements of a one-dimensional array.

2. The method of claim 1, wherein voltage samples are acquired during a predetermined number of measurement intervals and the samples acquired during each measurement interval are stored to corresponding one-dimensional arrays, further comprising:
   for each of the multiple one dimensional arrays, moving the contents of said one-dimensional array to a secondary storage memory before data is acquired for the next successive one-dimensional array, wherein the contents of the multiple one-dimensional arrays are stored as a two-dimensional array.

3. A method for detecting the presence of impulse noise in a channel of a communication system, comprising:
   collecting digital data samples of impulse noise from the communication channel;
   storing to a memory the digital data samples as a two-dimensional array having a plurality of columns and rows;
   plotting each of the rows of the two dimensional array as an analog metric versus time plot; and
   analyzing the plot for spikes in amplitude of the analog metric.

4. The method of claim 3 wherein the analog metric is voltage of the channel.

5. The method of claim 3 wherein the analog metric is instantaneous power of the channel.

6. The method of claim 5 where in the instantaneous power is plotted on a logarithmic scale.

7. The method of claim 3 wherein the step of analyzing is performed by a computer.

8. The method of claim 3 wherein the step of analyzing includes identifying regions on the instantaneous power plots where the power is low compared to other regions where the power is significantly higher and deeming that the lower regions represent AWGN noise regions and deeming that the higher regions represent the AWGN/burst noise regions.

9. A method for determining specific parameters associated with samples of noise information of signals on a communication channel that are acquired during a predetermined number of measurement intervals that are contained in a two dimensional array, comprising:
   analyzing an analog parameter of the samples of each row of data in the two-dimensional array with respect to time to determine which samples correspond to the one or more of the specific parameters;
   identifying one or more instances of impulse noise in the samples based on the analysis; and
   calculating values for the specific parameters based on the analysis of the analog parameters with respect to time.

10. The method of claim 9 wherein the analysis includes plotting the samples and visually analyzing the data.

11. The method of claim 9 where a measurement of a maximum value for the analog parameter represents an impulse noise signal.

12. The method of claim 9 wherein a measurement of a minimum value for the analog parameter represents AWGN.

13. The method of claim 9 wherein the analog parameter is voltage.

14. The method of claim 9 wherein the analog parameter is instantaneous power.

* * * * *